US010873686B2

(12) United States Patent
Rud et al.

(10) Patent No.: US 10,873,686 B2
(45) Date of Patent: Dec. 22, 2020

(54) EXPLOSION-PROOF THERMAL IMAGING SYSTEM (71) Applicant: Rosemount Inc., Shakopee, MN (US)

(72) Inventors: Jason H. Rud, Mayer, MN (US); Andrew J. Kitzman, Chandler, AZ (US); Sascha Ulrich Kienitz, Munich (DE); Ulrich Kienitz, Berlin (DE); Johannes Gentz, Berlin (DE)

(73) Assignee: Rosmeount Inc., Shakopee, MN (US)

( * ) Notice: Subject to any disclaimer, the term of this patent is extended or adjusted under 35 U.S.C. 154(b) by 45 days.

(21) Appl. No.: 14/755,107

(22) Filed: Jun. 30, 2015

(65) Prior Publication Data
US 2017/0006193 A1    Jan. 5, 2017

(51) Int. Cl.
*H04N 5/225* (2006.01)
*B32B 9/04* (2006.01)
(Continued)

(52) U.S. Cl.
CPC ............ *H04N 5/2252* (2013.01); *G01J 5/044* (2013.01); *G01J 5/048* (2013.01); *G01J 5/0806* (2013.01);
(Continued)

(58) Field of Classification Search
None
See application file for complete search history.

(56) References Cited

U.S. PATENT DOCUMENTS 4,977,418 A * 12/1990 Canty ...................... B01J 3/004
348/81
9,669,496 B2 6/2017 Takeshita
(Continued)

FOREIGN PATENT DOCUMENTS

JP          47-000180 A        4/1972
JP        2005179113 A        7/2005
(Continued)

OTHER PUBLICATIONS

International Search Report and Written Opinion for International Patent Application No. PCT/US2016/038500, dated Sep. 30, 2016, date of filing: Jun. 21, 2016, 7 pages.

(Continued)

*Primary Examiner* — Sath V Perungavoor
*Assistant Examiner* — Tyler B Edwards
(74) *Attorney, Agent, or Firm* — Christopher R. Christenson; Kelly, Holt & Christenson PLLC (57) ABSTRACT

A thermal imaging system is provided. The thermal imaging system includes an explosion-proof housing with an optical window configured to contain an explosive pressure. The optical window allows electromagnetic thermal energy to pass. A thermal imaging sensor is disposed within the explosion-proof housing. Thermal imaging electronics are coupled to the thermal imaging sensor and configured to provide at least one thermal image based on a signal from the thermal imaging sensor. A lens assembly is disposed at least in front of the optical window external to the explosion-proof housing. A composite optical window for thermal imaging is also provided. In another embodiment, a thermal imaging system includes an explosion-proof housing having an optical window configured to contain an explosive pressure. An infrared (IR) camera is disposed within the explosion-proof housing. A reflector reflects electromagnetic thermal energy to the IR camera, but prevent an object from impacting the optical window.

20 Claims, 5 Drawing Sheets (51) Int. Cl.
    *B32B 27/34*    (2006.01)
    *H04N 5/33*     (2006.01)
    *G01J 5/04*     (2006.01)
    *G01J 5/08*     (2006.01)
    *G02B 7/00*     (2006.01)
    *G01J 5/00*     (2006.01)

(52) U.S. Cl.
    CPC ........... *G01J 5/0809* (2013.01); *G01J 5/0812* (2013.01); *G02B 7/007* (2013.01); *H04N 5/33* (2013.01); *G01J 2005/0077* (2013.01); *H04N 2005/2255* (2013.01)

(56) References Cited

U.S. PATENT DOCUMENTS

| | | | |
|---|---|---|---|
| 9,735,561 B2 | 8/2017 | Schweiz et al. | |
| 9,778,217 B2 | 10/2017 | Liu et al. | |
| 2009/4285526 | 11/2009 | Mikkelsen et al. | |
| 2010/0079842 A1* | 4/2010 | Dunleavy | B82Y 20/00 359/245 |
| 2014/0267763 A1* | 9/2014 | Neal | H04N 5/33 348/164 |

FOREIGN PATENT DOCUMENTS

| | | |
|---|---|---|
| JP | 2010514149 A | 4/2010 |
| JP | 2011507036 A | 3/2011 |
| JP | 2015023412 A | 2/2015 |

OTHER PUBLICATIONS

First Chinese Office Action, dated Oct. 18, 2018, for Chinese Patent Application No. 201611019134.3, 18 pages including English translation.
Extended Search Report dated Jan. 7, 2019, for European Patent Application No. 16818475.2, 34 pages.
Japanese Office Action dated Dec. 25, 2018, Japanese Patent Application No. 2017-567622, 12 pages, including English translation.
Second Office Action dated Jul. 2, 2019 for Chinese Patent Application No. 201510965011.8, 12 pages including English translation.
Decision of Rejection dated Jul. 16, 2016 for Japanese Patent Application No. 2017-567622, 7 pages with English translation.
Communication Pursuarit to Article 94(3) EPC for European Patent Application No. 16818475.2, dated Jun. 10, 2020, 5 pages.

* cited by examiner

Fig. 5

EXPLOSION-PROOF THERMAL IMAGING SYSTEM

BACKGROUND

Infrared cameras generally form an image using infrared radiation, similar to the way in which a standard camera forms an image using visible light. However, an infrared camera typically operates with longer wavelength illumination, such as 14,000 nanometers. Infrared cameras are highly useful in a number of applications to provide a non-contact indication of heat present in an image field. Moreover, the infrared cameras, in some contexts, can be calibrated such that an indication of surface temperature can be derived directly from the image provided by the infrared camera.

One environment in which infrared cameras are particularly useful is in process control and monitoring. In such environments, process fluids, such as petrochemicals, slurries, pharmaceutical compounds, and the like may be processed and conveyed to various locations within the processing facility. However, process control and monitoring environments represent a challenge for a number of devices in that the environment itself may have highly flammable or explosive gases present therein. Accordingly, in some such environments, it is important for electronic devices used therein to be housed in an explosion-proof enclosure. When so housed, even if the circuitry of the device generates a spark or has an electrical component with a surface temperature high enough to ignite the environment, the resulting ignition will be entirely contained within the enclosure and not able to escape into the ambient environment. This is important in order to ensure safety of the process control installation and workers therein.

One example of an explosion-proof rating is an ATEX certification to Ex-d standards EN60079-0 and EN60079-1 for potentially explosive atmospheres. Generally, explosion-proof housings are relatively bulky in order to be mechanically robust enough to contain an internal explosion without rupturing. Generally, such explosion-proof containers are very robust metal enclosures that are designed to withstand explosive pressures. However, for devices, such as infrared cameras that rely on optical sensing of the environment, the enclosure must accommodate a window of some sort in order to allow the infrared camera to view the environment. However, in order to contain the explosive pressures and impact requirements, the window must be relatively thick. Unfortunately, increasing the thickness of the window such that it is mechanically robust enough to contain the explosive pressures will reduce the transmissivity of the window, increase the cost of the window, and undesirably affect the radiometric temperature measurements.

SUMMARY

A thermal imaging system is provided. The thermal imaging system includes an explosion-proof housing with an optical window configured to contain an explosive pressure. The optical window allows electromagnetic thermal energy to pass. A thermal imaging sensor is disposed within the explosion-proof housing. Thermal imaging electronics are coupled to the thermal imaging sensor and configured to provide at least one thermal image based on a signal from the thermal imaging sensor. A lens assembly is disposed at least in front of the optical window external to the explosion-proof housing. A composite optical window for thermal imaging is also provided.

In another embodiment, a thermal imaging system is provided that has an explosion-proof housing including an optical window configured to contain an explosive pressure. The optical window allows electromagnetic thermal energy to pass through. An infrared (IR) camera is disposed within the explosion-proof housing. A reflector is configured to reflect electromagnetic thermal energy to the IR camera, but prevent an object from impacting the optical window.

DETAILED DESCRIPTION OF ILLUSTRATIVE EMBODIMENTS

Embodiments of the present invention generally improve a thermal imaging system by modifying or providing an explosion-proof window and/or additional modifications prior to the thermal imaging optics. In general, thermal imaging optics of thermal imaging cameras are not designed to withstand the internal pressures that are required to meet explosion-proof approvals. For example, the modulus of rupture (MR) for suitable IR transmitting materials is relatively small.

Embodiments of the present invention generally provide an infrared window that is suitable for acting as a pressure barrier. In some embodiments, the infrared window is formed of zinc selenide (ZNSE). While one possibility for providing an explosion-proof thermal imaging system is simply to place a conventional infrared camera within a robust housing having a thick IR window formed of an IR transmitting material, such as ZNSE, the size of the window required would be of such diameter that the thickness of the window required to contain explosive pressures would impermissibly affect optical performance. Further, such a window would be cost prohibitive. In accordance with some embodiments of the present invention, the IR window is placed within or at least behind at least one optical element of the thermal imaging optics. In this way, the optical elements can reduce the size of the ray bundle that must pass through the IR window. In this way, the diameter of the IR window can be reduced, which can then allow the thickness to be reduced as well while still complying with pressure and impact containment requirements.

Figure 1:
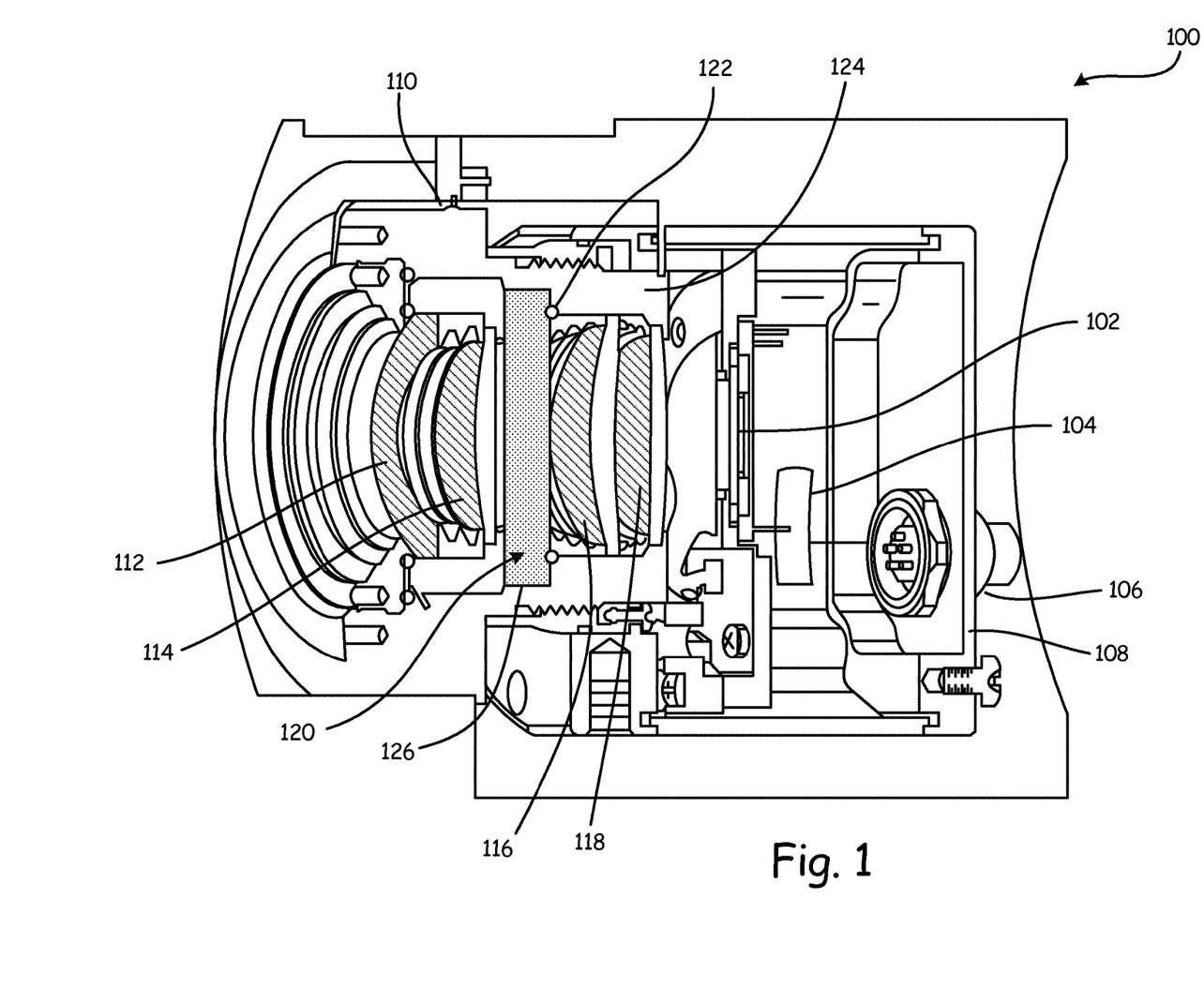
FIG. 1 is a diagrammatic view of an explosion-proof thermal imaging system in accordance with an embodiment of the present invention.

FIG. 1 is a diagrammatic view of an explosion-prop thermal imaging system in accordance with an embodiment of the present invention. System 100 includes thermal imaging sensor 102 and associated electronics 104 coupled to sensor 102. Electronics 104 are electrically coupled to connector 106 that passes through housing 108 to allow system 100 to be coupled to a suitable source of power and/or communication. A lens assembly 110 is disposed proximate sensor 102 and is arranged to focus thermal radiation on thermal imaging sensor 102. Lens assembly 110 includes, in the illustrated embodiment, four distinct lenses 112, 114, 116, and 118. Additionally, an explosion-proof window 120 is disposed between lenses 114 and 116. Window 120 is formed of a material with high infrared transmissivity, such as ZNSE. An environmental seal, such as elastomeric O-ring 122, seals explosion-proof window 120 to the frame of lens assembly 110. Window 120 is sired, with respect to frame 124 to provide a frame-quenching path 126. Since window 120 is disposed within lens assembly 110, the diameter of window 120 smaller than would be required if window 120 were placed in front of lens 112. By reducing the diameter of window 120, the thickness of window 120 can be reduced while still being able to comply with pressure containment requirements. This allows the material cost to be reduced while also potentially increasing the optical performance of the overall system.

Figure 2:
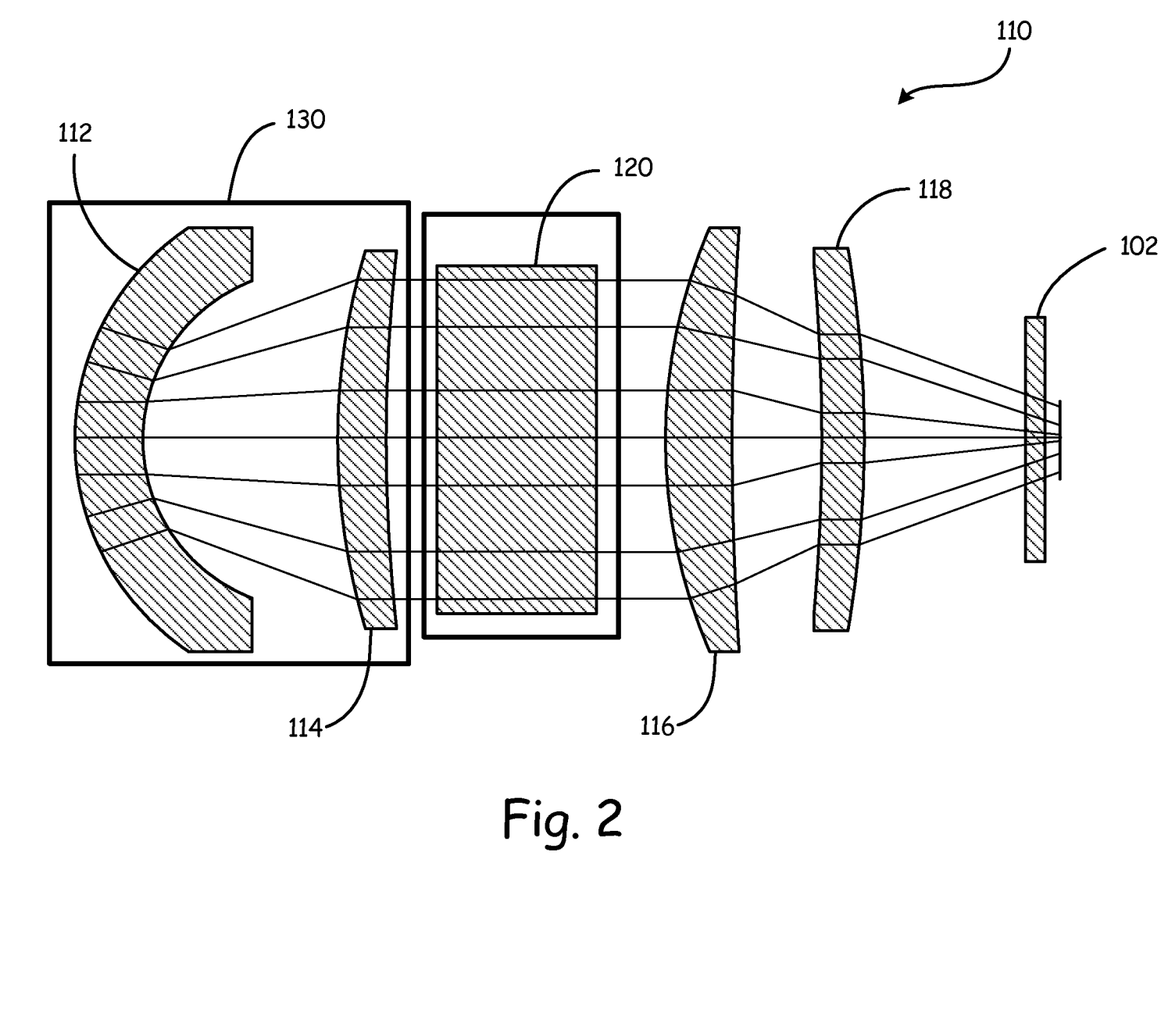
FIG. 2 is a diagrammatic view of IR window disposed within a lens assembly in accordance with an embodiment of the present invention.

FIG. 2 is a diagrammatic view of window 120 disposed within lens assembly 110 in accordance with an embodiment of the present invention, Thermal imaging electromagnetic radiation first passes through the first section (indicated at reference numeral 130) before passing through window 120. The first section, 130, is generally comprised of outer focusing lens 112, and secondary focusing lens 114. Once the thermal imaging electromagnetic radiation passes through secondary focusing lens 114, it passes through window 120, which, in one embodiment, is formed of zinc selenide. Then, the thermal imaging electromagnetic radiation passes through focusing lens 116, which is arranged to converge the ray bundle. Thermal imaging electromagnetic radiation exiting ions 116 enters focusing lens 118, which further focuses the ray bundle upon camera sensor 102 for image acquisition.

In order to comply with relevant explosion-proof approvals, a device must pass certain tests. In one test, a one inch diameter sphere is impacted on the optics with four joules of force. This ensures that approved designs will be able to withstand at least some level of impact without unduly affecting the pressure-containing abilities of the device. Unfortunately, IR windows (particularly those formed of ZNSE) are quite susceptible to damage from such impact tests.

Embodiments of the present invention that provide an IR window disposed within a camera lens assembly inherently protect the IR window from the impact of such tests. Providing the IR window within the lens assembly ensures that the impact of the one inch diameter sphere only affects the outer lens and does not affect the pressure-containing ability of the system.

Figure 3:
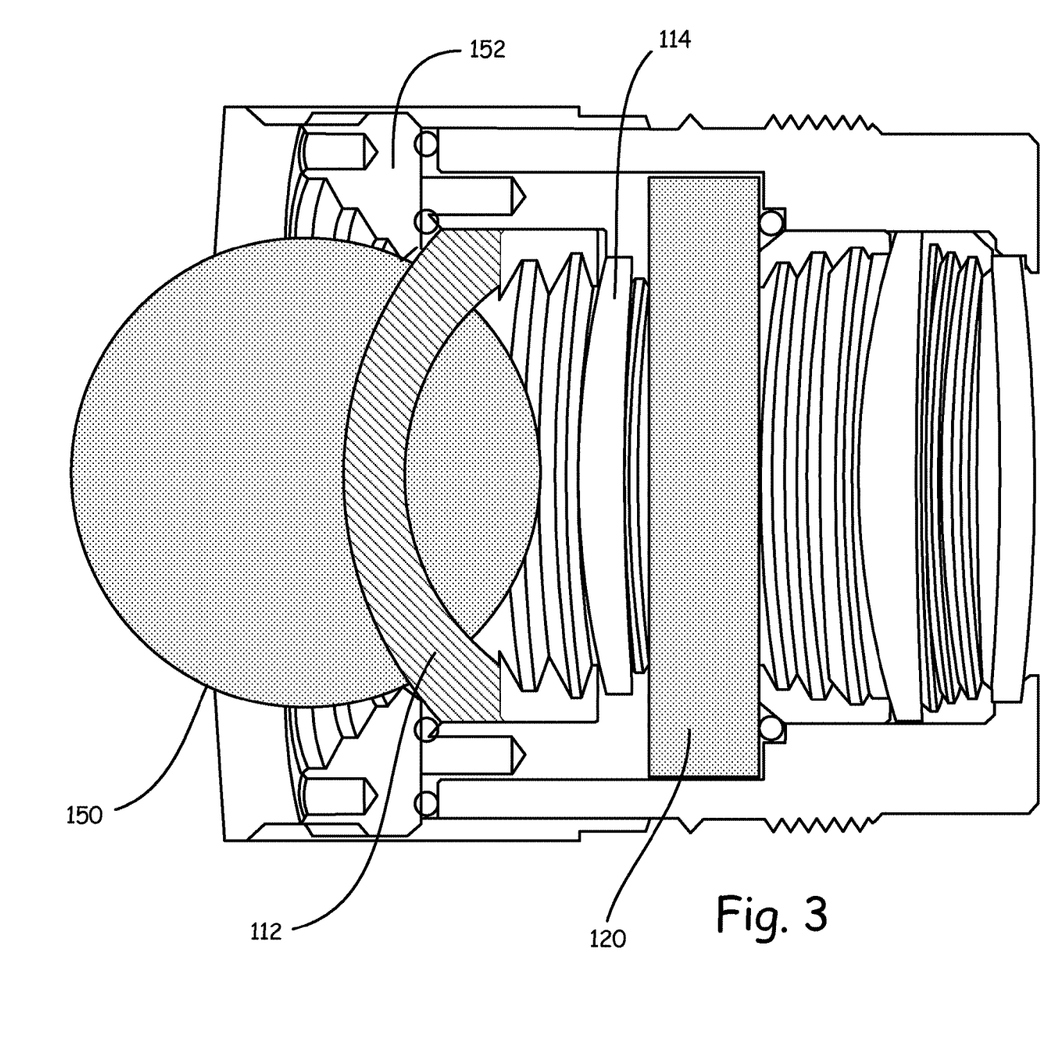
FIG. 3 is a diagrammatic view showing an impacting object striking and passing through a focusing lens.

FIG. 3 is a diagrammatic view showing an impacting sphere 150 striking and passing through focusing lens 112. However, metal shroud 152 is sized such that the one inch diameter sphere is unable to reach IR window 120 or even lens 114. Thus, at least some embodiments of the present invention provide an improved explosion-proof thermal imaging system with a shroud 152 disposed outside of lens 112 having a diameter that is smaller than one inch. Impacting object 150 is thus stopped prior to reaching and potentially impacting IR window 120. When impacting object 150 comes into contact with the lens assembly, it will first be slowed by outer lenses 112, 114 and finally stopped by the lens frame (shroud 152) before impacting IR window 120. Such arrangement facilitates approval compliance for explosion-proof ratings. Once impacted, outer lens 112 is destroyed, and the system will no longer be able to produce a viable measurement. However, this measurement failure will be easily identifiable by the thermal image itself, and an operator will be alerted to the fault. Accordingly, electronics 104, coupled to sensor 102 (shown in FIG. 1) may be configured, via hardware, software, or a combination thereof, to compare a time sequence of thermal images or a parameter related to transmissivity of the lens system over time in order to detect changes, such as fracture or deterioration of one or more lenses in lens assembly 110. In this way, should a lens break or become damaged, electronics 104 will provide an alert to the operator.

As set forth above, impact tests of zinc selenide windows have indicated that such IR windows are not particularly impact resistant. However, impact resistance is very important in order to obtain and maintain explosion proof-approvals. While embodiments described thus far, generally protect the explosion-proof window by placing it within in the lens assembly of the thermal imaging system, at least some embodiments specifically adapt the IR window for impact.

Figure 4A:
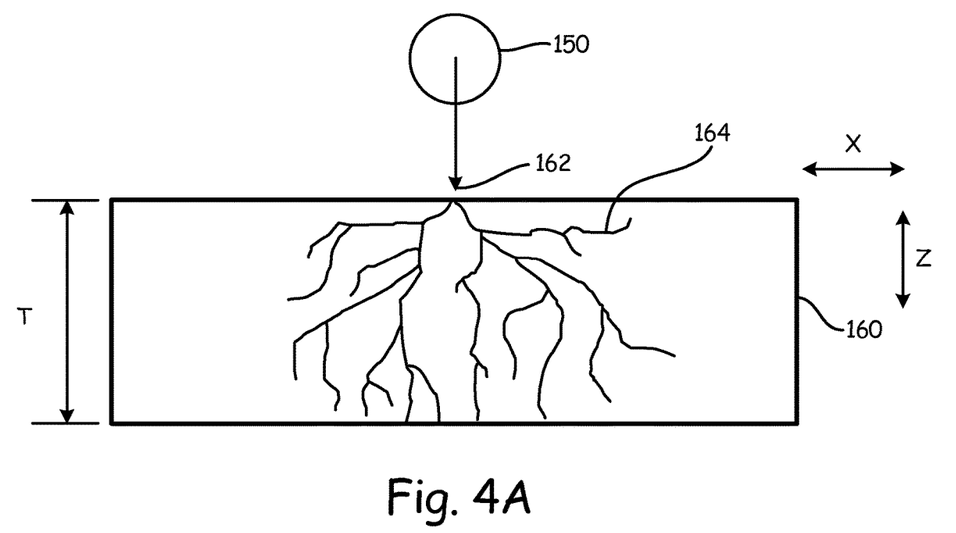
FIG. 4A is a diagrammatic view of an impacting object impacting a zinc selenide window.

FIG. 4A is a diagrammatic view of an impacting object 150 impacting a zinc selenide window 160 at location 162. Upon impact, a number of fractures 164 expand from point 162 in both the x and z directions. Once a fracture travels across the entire thickness (T) of window 160, the mechanical integrity of window 160 is compromised and explosive pressures will no longer be contained.

Figure 4B:
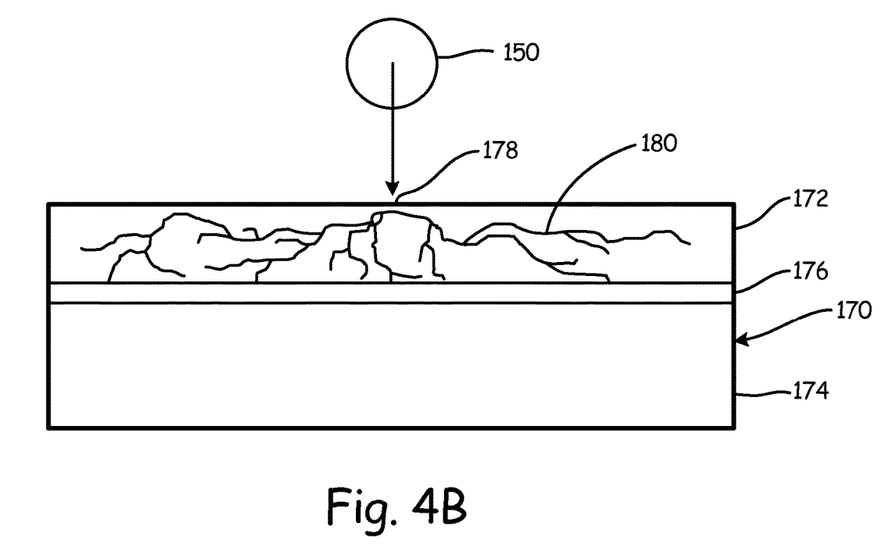
FIG. 4B is a diagrammatic view of a composite IR window in accordance with an embodiment of the present invention.

FIG. 4B is a diagrammatic view of a composite IR window 170 in accordance with an embodiment of the present invention. Window 170 is formed of a pair of thinner zinc selenide layers 172, 174 that sandwich an IR-transparent polyamide layer 176. Polyamide layer 176 is highly impact resistant and does not fracture like zinc selenide. Accordingly, when impacting object 150 strikes layer 172 at location 178, the fracture propagates as indicated at reference numeral 180. The fracture will ultimately propagate across layer 172, but will not propagate through polyamide layer 176. Accordingly, the mechanical integrity of layer 174 is unchanged and still able to contain the explosive pressures required for obtaining and maintaining requisite explosion-proof approvals. Most of the energy of the impact is absorbed by first layer 172, thereby lowering the impact applied to second layer 174 to a level that will resist fracture. Furthermore, polyamide layer 176 can facilitate interrupting the propagation of such fractures. Layer 174 contains a pressure bearing seal and is required to remain intact for explosion-proof approvals. Utilizing the composite IR window illustrated in FIG. 4B, embodiments of the present invent may be able to provide a simple enclosure for known thermal imaging systems. However, it is expressly contemplated that the composite IR window provided in FIG. 4B can be used in embodiments described above, by incorporating the hybrid window design into IR window 120.

Figure 5:
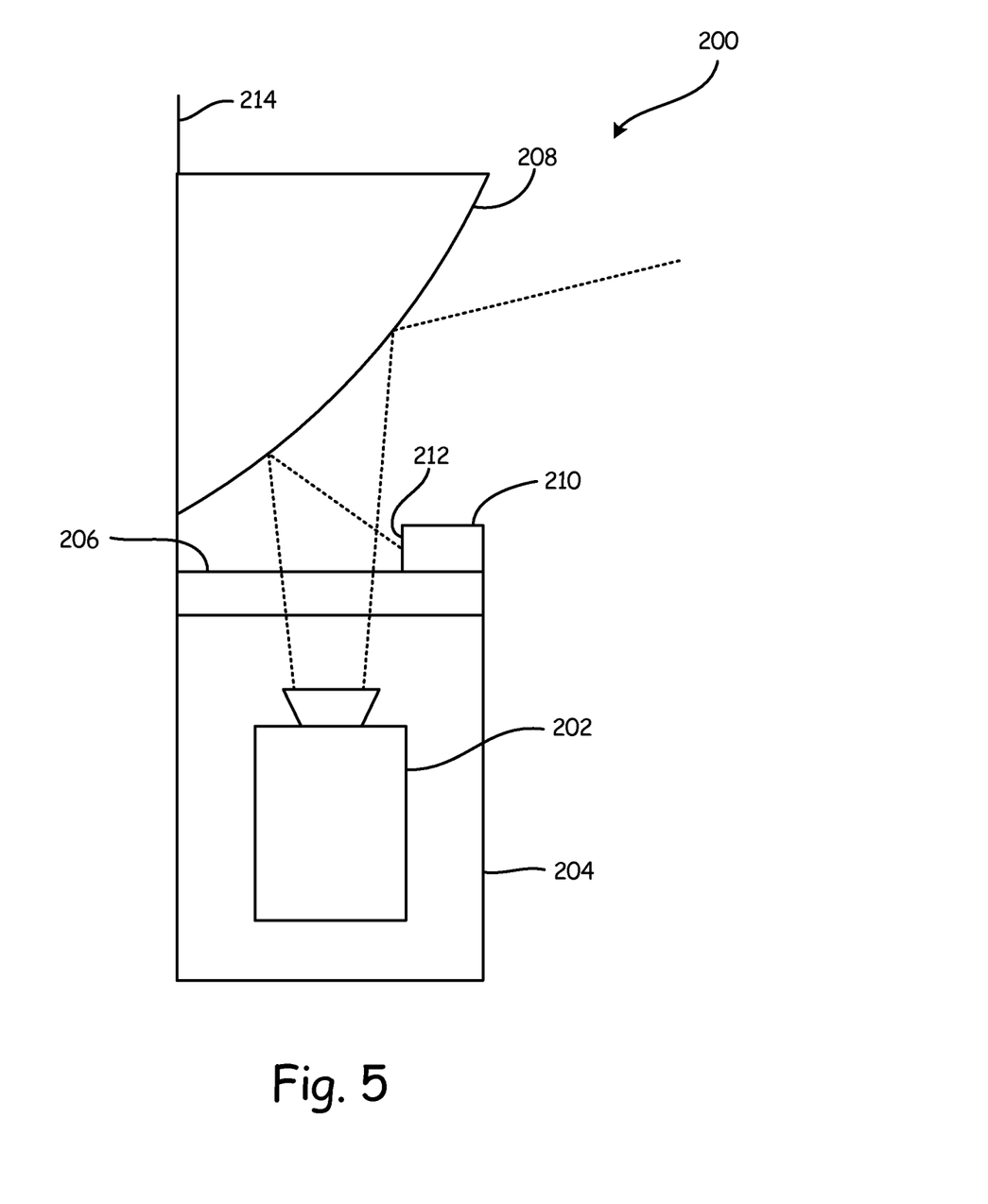
FIG. 5 is a flow diagram of a method of operating an infrared camera in a hazardous environment in accordance with an embodiment of the present invention.

FIG. 5 is a diagrammatic view of an improved explosion-proof thermal imaging system in accordance with an embodiment of the present invention. Thermal imaging system 200 includes IR camera 202 disposed within explosion proof housing 204. Explosion proof housing 204 includes, at one end, IR window 206. IR window 206 does not have any grid or solid structures that would otherwise interrupt infrared radiation. In some embodiments, IR window 206 may include the hybrid IR window design shown in FIG. 4B. However, embodiments also include IR window 206 as simply being a single monolithic piece of IR-transparent material, such as zinc selenide. In order to protect IR window 206 from impacts, reflector 208 is placed substantially in front of IR window 206. Accordingly, objects, such as impacting object 150 are prevented from striking IR window 206. In this way, reflector 208 provides a mechanical shield for IR window 206 while optically participating in the acquisition of thermal images. In the example shown in FIG. 5, reflector 208 is a parabolic mirror thus helping to focus the image field upon IR camera 202. Additionally, system 200 also includes emissivity reference 210 disposed proximate IR window 206 and arranged to have at least one surface 212 with a known emissivity. When IR camera 202 images surface 212, the known emissivity in combination with the image of surface 212 can provide valuable information about the condition of one or both of mirror 208 and IR window 206. For example, should mirror 208 or IR window 206 become dirty or damaged, such condition would be ascertainable by IR camera 202 by viewing emissivity reference surface 212. Additionally, in at least some embodiments, the entire structure shown in FIG. 5 may rotate about axis 214 such that a 360 field of view can be thermally imaged using IR camera 202. This would allow even relatively low-resolution imagers to be capable of increasing resolution if the IR camera is used in a line scanner mode. Additionally, in at least some embodiments, the mirror 208 may simply be rotated about the optical axis of IR camera 202 in order to provide the 360 degree field of view imaging. This would simplify the design in that rotation of IR camera 202, and the associated rotational connectors, would not be required.

Although the present invention has been described with reference to preferred embodiments, workers skilled in the art will recognize that changes may be made in form and detail without departing from the spirit and scope of the invention.

What is claimed is:

1. A thermal imaging system comprising:
   a metallic explosion-proof housing including an optical window, wherein the explosion-proof housing complies with at least one explosion-proof rating, the optical window allowing electromagnetic thermal energy to pass through;
   a thermal imaging sensor disposed within the explosion-proof housing;
   thermal imaging electronics coupled to the thermal imaging sensor and configured to provide at least one thermal image based on a signal from the thermal imaging sensor;
   at least one lens disposed at least in front of the optical window and external to the explosion-proof housing; and
   wherein the IR transparent optical window is formed of an IR transparent, impact resistant layer comprised of a first material sandwiched between a first and a second IR transparent layer comprised of a second material.

2. The thermal imaging system of claim 1, wherein the at least one lens includes a first and second lens disposed in front of the IR transparent optical window, wherein the first lens is external to the explosion proof housing.

3. The thermal imaging system of claim 2, wherein the at least one lens further includes a third lens disposed within the explosion-proof housing and configured to focus the electromagnetic thermal energy on the thermal imaging sensor.

4. The thermal imaging system of claim 1, wherein the IR transparent optical window comprises of zinc selenide.

5. The thermal imaging system of claim 1, wherein the lens assembly includes a housing having a diameter less than 1 inch.

6. The thermal imaging system of claim 1, wherein the thermal imaging electronics are disposed within the explosion-proof housing.

7. The thermal imaging system of claim 4, wherein the thermal imaging sensor obtains the at least one thermal image substantially completely through a reflector, wherein the reflector is disposed to prevent an object from impacting the optical window.

8. The thermal imaging system of claim 1 wherein the at least one lens comprises a lens assembly, the lens assembly comprising:
   a first forward-facing convex lens disposed in front of the optical window and external to the explosion-proof housing;
   a second forward-facing convex lens disposed behind the first lens and in front of the optical window;
   a third forward-facing convex lens disposed behind the optical window and within the explosion-proof housing; and
   a fourth rearward-facing convex lens disposed behind the third lens and within the explosion-proof housing.

9. The thermal imaging system of claim 7 wherein the reflector is external to the explosion-proof housing.

10. The thermal imaging system of claim 9 wherein the reflector comprises a parabolic mirror.

11. The thermal imaging system of claim 10 wherein the reflector is within a point of view of the thermal imaging sensor and reflects light, received from a surface outside of the point of view of the thermal imaging sensor, towards the thermal imaging sensor.

12. The thermal imaging system of claim 1 and further comprising a shroud disposed in front of the IR transparent optical window and having a diameter of less than 1 inch.

13. The thermal imaging system of claim 6, wherein the electronics are further configured to detect damage to the at least one lens based on the at least one thermal image.

14. The thermal imaging system of claim 13, wherein the electronics are further configured to generate an alert based on the detection of damage to the at least one lens.

15. The thermal imaging system of claim 1, wherein the first material comprises polyamide.

16. The thermal imaging system of claim 15, wherein the second material comprises zinc selenide.

17. A composite optical window for thermal imaging, the composite optical window including:
   a first layer of material that passes thermal imaging electromagnetic radiation, but is subject to fracture;
   a second layer of material that passes thermal imaging electromagnetic radiation, but is also subject to fracture; and
   an IR-transparent, impact resistant, layer disposed between the first and second layers and, wherein each of the first and second layers contain an explosive pressure in accordance with at least one explosion-proof rating; and
   wherein each layer of the composite optical window is composed of only IR transparent materials.

18. The composite optical window of claim 17, wherein the first and second layers are formed of zinc selenide.

19. The composite optical window of claim 18, wherein the IR-transparent impact resistant layer comprises polyamide.

20. The composite optical window of claim 17 wherein the first layer is disposed in front of both the IR-transparent impact resistant layer and the second layer and can absorb a force from an impact of an object, such that the IR-transparent impact resistant layer can maintain a pressure bearing seal of an interior of an explosion proof housing in which the composite optical window is disposed, wherein the force being exerted upon impact by the object is at least 4 joules.

\* \* \* \* \*

UNITED STATES PATENT AND TRADEMARK OFFICE
CERTIFICATE OF CORRECTION

| | |
|---|---|
| PATENT NO. | : 10,873,686 B2 |
| APPLICATION NO. | : 14/755107 |
| DATED | : December 22, 2020 |
| INVENTOR(S) | : Jason H. Rud et al. |

It is certified that error appears in the above-identified patent and that said Letters Patent is hereby corrected as shown below:

On the Title Page

Item (73) Assignee Please insert:
--Rosemount, Inc., Shakopee, MN (US)--

In the Claims

Column 5, Line 64, Claim 4, delete "of" before "zinc".

Signed and Sealed this
Fifteenth Day of November, 2022

Katherine Kelly Vidal
*Director of the United States Patent and Trademark Office*